United States Patent [19]

Collins

[11] Patent Number: 5,078,180
[45] Date of Patent: Jan. 7, 1992

[54] AUTOMATICALLY OPERATED GATE VALVE FOR RECREATIONAL VEHICLES

[76] Inventor: Richard Collins, 2981 Hillman-Ford Rd., Morral, Ohio 43337

[21] Appl. No.: 560,560

[22] Filed: Jul. 30, 1990

[51] Int. Cl.$^5$ .................. F16K 3/02; F16K 31/163
[52] U.S. Cl. ........................... 137/899; 4/323; 137/554; 251/30.05; 251/58
[58] Field of Search .................. 4/323; 137/554, 899; 251/30.05, 58

[56] References Cited

U.S. PATENT DOCUMENTS

| 3,378,025 | 4/1968 | Hilde, Jr. | 137/351 |
|---|---|---|---|
| 3,811,462 | 5/1974 | Feliz | 137/899 |
| 3,941,349 | 3/1976 | Pierson | 251/100 |
| 3,949,963 | 4/1976 | Aoki | 137/554 X |
| 3,952,995 | 4/1976 | Nagumo et al. | 251/58 X |
| 3,970,280 | 7/1976 | Kunz | 251/58 |
| 4,214,324 | 7/1980 | Kemper et al. | 4/321 |
| 4,483,509 | 11/1984 | Lewcock | 251/231 X |
| 4,693,447 | 9/1987 | Perez | 4/323 |
| 4,779,650 | 10/1988 | Sargent et al. | 137/899 |
| 4,875,504 | 10/1989 | Nicholson | 137/899 |
| 4,905,325 | 3/1990 | Colditz | 4/321 |

Primary Examiner—Gerald A. Michalsky
Attorney, Agent, or Firm—Watkins, Dunbar & Pollick

[57] ABSTRACT

This invention is a hydraulic device for operating a gate valve in the drainage line of a recreational vehicle. The device consists of a support plate mounted to the gate valve or drainage line. A hydraulic cylinder with a hydraulic rod is pivotally mounted to the support plate. The hydraulic rod is attached to the gate control rod by means of a pivot arm that is also pivotally attached to the support plate. The device is operating by means of a hydraulic pump, a motor and control means for operating the motor, typically an electrical switch.

28 Claims, 3 Drawing Sheets

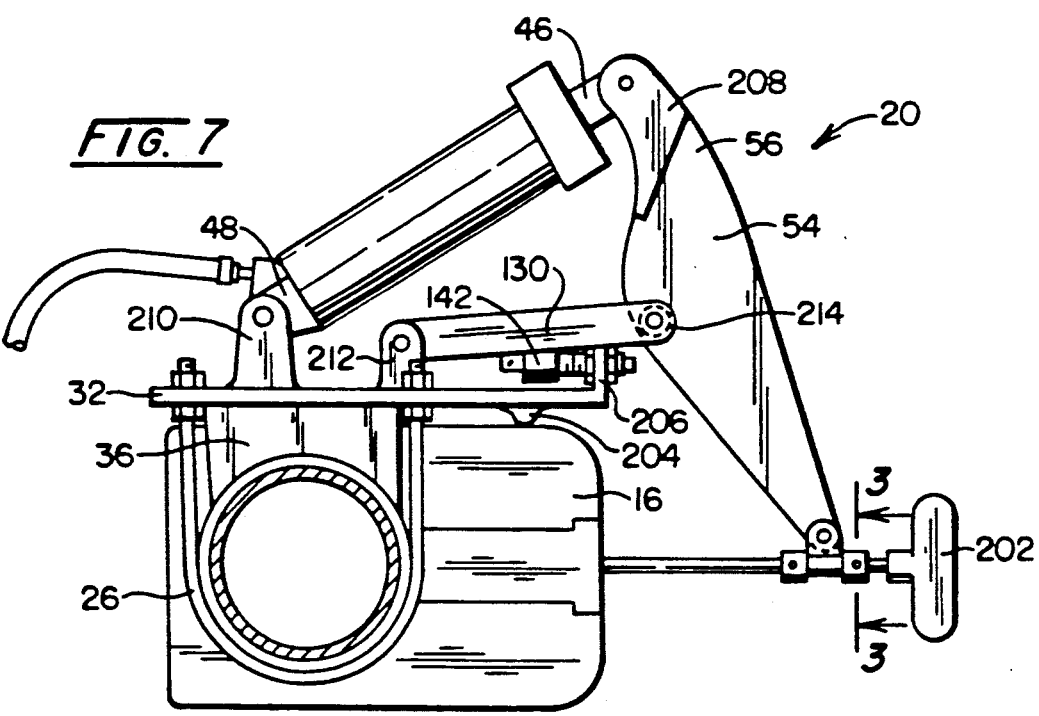

AUTOMATICALLY OPERATED GATE VALVE FOR RECREATIONAL VEHICLES

BACKGROUND OF THE INVENTION

1. Field of the Invention

This invention relates to gate valves, and more particularly to automatically operated gate valves for use with holding or similar tanks for recreational or similar type vehicles.

2. Description of the Prior Art

Users of recreational vehicles outfitted with a water closet, tub or shower or both, and a kitchen sink are required to discharge the waste and gray water from these fixtures into onboard holding tanks that must be discharged or dumped into an approved sanitary sewer or septic system usually located in a trailer court or camp ground.

Users of recreational vehicles often find it inconvenient or difficult to dump the holding tanks into sanitary facilities because of their own physical limitations, bad weather conditions, darkness, etc. Dumping typically requires kneeling down and reaching under the vehicle for a distance of two to two and a half feet. In this position, the operator is off-balance and unable to obtain good leverage to operate a manual gate valve. This can be especially troublesome for those of slight build, the elderly and the handicapped. Moreover, while operating the gate valves, the operator is sure to be contaminated with waste should there be a failure in the waste hose, hose connection or hose clamp. In addition, gate valve operation can be especially worrisome in strange surroundings and especially annoying and frustrating in foul weather or when biting insects are at their peak.

One approach to this problem has been through the development of telescoping drain assemblies that are swiveled and telescoped to the discharge site such as revealed in Feliz U.S. Pat. No. 3,811,462 and Sargent et al. U.S. Pat. No. 4,779,650. Although these inventions attempt to solve the piping problem between the discharge line of the vehicle and the discharge point, neither of them address the problem of valve control since both of these inventions continue to use manually operated valves to open and close the discharge lines.

Kemper et al U.S. Pat. No. 4,214,324 and Perez U.S. Pat. No. 4,693,447 disclose waste dump valves that are electrically controlled for use in aircraft and railroad cars respectively. Hilde, Jr. U.S. Pat. No. 3,375,025 is directed to a pneumatic valve mechanism for use with a mobil system for evacuating and recharging portable commodes.

Pierson U.S. Pat. No. 3,941,349 is directed toward the development of electromechanically actuated gate valves. Pierson's inventions, however, have several shortcomings and problems. First, all of Pierson's mechanisms for controlling the gate valve are contained within the housing of the gate valve itself. As such, it is not possible to convert an existing manual valve to a mechanically operated device. All the vehicle owner can do is to remove the manual valve and replace it with one of Pierson's electromechanically operated valves. Further if the electromechanical mechanism of the Pierson valve breaks down, it is impossible to repair it with out removing it from the drainage line—a process which requires replacement of a portion of the drainage lines in addition to the repair or replacement of the valve itself.

Pierson's solenoid driven valves are spring biased so as to remain in the closed position unless the solenoid is electrically actuated. As a result, Pierson's solenoid devices must draw current continuously while the holding tank is being emptied thereby adding to the cost of operation and increasing the potential for failure as a result of electrical short or burnout. Such continuous operation also increases the chance for an electrical fire. Moreover, Pierson's closed biased solenoid valves do not allow the valve to be left in an open position, even by manual operation. In many instances this is the preferred position, especially when the vehicle has been permanently parked and the drainage line hooked up to the sanitary sewer. In such a setting, the drainage line is left open without further consideration. Using the Pierson valve, the vehicle user must periodically open the gate valve to drain the holding tanks even when the vehicle is in a parked mode and connected to a sanitary sewer. Such additional operation tends only to shorten the life of the Pierson valve. Because Pierson's solenoid valves effectively have only a fully opened or closed position, it is impossible to adjust the volume of discharge from the holding system. In the event of a power failure, the user of a Pierson solenoid valve must resort to manual operation of the valve in order to empty the holding tanks.

Pierson has also developed motor driven direct drive and gear drive valves. Such motor driven valves are more complex than the solenoid valves thereby increasing the potential for malfunction. Since the drive mechanisms are contained within the valve housing, the only way to repair such valves is by removing them from the drainage line, which, as we have seen, is costly since portions of the drainage line must be replaced along with possibly the valve itself.

SUMMARY OF THE INVENTION

The present invention overcomes the inconvenience and burden of operating the manual valves found on most recreational vehicles, especially in inclement weather, strange surroundings, and other environmental hostilities which make such valve operation specially onerous for the weak, elderly and disabled. It also overcomes the problems and obstacles encountered with the self-contained electromechanically operated valves found in the prior art, especially the inability to convert an existing manual valve to a mechanical valve, the inability to set the valve to any position including fully opened or closed, and the necessity for unneeded or prolonged operation under certain conditions that do not justify such operation and serve only to add to the cost of operation, reduce the operational life time, and increase the risk of electrical short or fire.

The present invention consists of a hydraulic device that is connected to the gate of a gate valve for the purpose of opening and closing the valve. The invention can be used to convert existing manual gate valves to hydraulically operated valves without removing the existing valve from the drainage line of the recreational vehicle (RV). Because it can be mounted on the existing valve or drainage line, it can be readily removed for repair or replacement without the need to remove the gate valve from the drainage line. Although the device can be installed within the gate valve housing, it is preferable not to do so for the above mentioned reasons.

Various additional features of the invention allow the gate valve to be stopped at any position between fully opened and fully closed so as to adjust the volume of discharge form the holding system. The invention uses energy only in moving the valve from one position to another. No energy or power is required to hold the valve in any desired position and thus the valve will remain in the selected position even when power is lost. The invention can be disconnected from the valve to allow for manual operation of the valve to any position should the device ever fail or power be lost. The valve can be operated from remote locations, typically from within the RV and from a control panel located on the exterior of the RV preferably in the area of the drainage discharge. The invention can also be provided with an indicator such as a light, buzzer, or dial to indicate the position of the gate valve.

The invention is not limited to RVs but can be used in any vehicle having holding tanks where it is desirable to control the opening and closing of the drainage line from the holding tanks.

In one basic form, especially useful for opening, closing, or holding a holding tank gate valve in any position where the gate valve is located in a passage connected to a holding tank of a recreational or similar type vehicle, the invention consists of a hydraulic cylinder that has a cylindrical housing with a hydraulic rod projecting from the center of one end, a way or means for connecting the hydraulic rod to the gate of the gate valve and a means for controlling the movement of the hydraulic rod into and out of the hydraulic cylinder housing. Typically, the means for controlling the movement of the hydraulic rod into and out of the housing is a hydraulic pump for pumping hydraulic fluid into and out of the housing so as to cause the hydraulic rod to move into or out of the housing. A motor is used to operate the hydraulic pump and is, in turn, controlled by a switch device. Generally, an electrical motor and an electrical switch are preferred, however, it is to be understood that there are other means for operating hydraulic pumps such as a hydraulic motor and that such a device can be operated by vacuum or air pressure switching devices.

A valve can be placed in the hydraulic line for maintaining the amount of hydraulic fluid in the hydraulic cylinder so as to control the position of the gate within the gate valve. The opening and closing of this valve can be controlled by a suitable means such as a solenoid.

The motor that is used to move hydraulic fluid into and out of the hydraulic cylinder is preferably a reversing motor. When a reversing motor is used, the switching means for controlling and operating the motor should be capable of operating the motor in either a forward or reverse direction. It is desirable to the switching means for controlling the operation of the motor to be placed at two or more remote locations. For example, it is desirable to have one control means such as a switch panel located within the recreational vehicle so that one does not have to leave the recreational vehicle to control the opening and closing of the gate valve. A second desirable location for the motor switching or control means is on a panel located on the outside of the vehicle near the point of discharge of the drainage system. In such a location, the user of the RV can monitor the discharge operation into the sanitary sewer.

It is also desirable that the hydraulic means for operating the gate valve be capable of being disconnected from the gate valve so as to operate the gate valve in the event of loss of power or energy with which to operate the hydraulics of this invention. In such a case, the hydraulics can be disconnected by means of a locking pin or other such quick disconnect type feature. When the hydraulics are disconnected, a handle can be attached to the gate rod of the gate valve so as to manually operate the valve.

Finally, it is desirable to know the position of the gate within the valve. This can be achieved by providing a sensing and indicating mechanism for determining the position of the gate within the gate valve. The sensing mechanism is typically a switch responsive to the position of the gate while the indicating means can be a visual indicating means such as a light or dial, or an audible means such as a buzzer or bell.

Another aspect of the invention is a means for externally mounting a gate valve hydraulic control device, preferably a hydraulic control device, on either the gate valve or the drainage line. This aspect of the invention consists of a support plate and a means for fastening the support plate to the drainage line or the external portion of the gate valve housing. In its simplest form, the fastening means can simply be one or more U-bolts that pass around the drainage line and pass through aligning holes in the support plate where they are fastened to the support plate by means of bolts. For additional stability, a saddle piece conforming to the drainage line can be secured to the U-bolt after it passes around the drainage line by means of bolts and then the support plate bolted on to the projecting ends of the U-bolts.

In another embodiment, rather than using the saddle piece after the U-bolt passes around the drainage line, the support plate may have on its under surface one or more projecting tangs having a surface conforming to a portion of the circular surface of the drainage pipe. In this embodiment, the support plate rests on the drainage line as a result of the downward projecting tangs that conform to the drainage line and the U-bolt passes around the drainage line up through the apertures in the support plate and are bolted to the upper surface of the support plate.

In another embodiment, a suitable slot can be formed in the downward projecting tang that conforms to the drain line and a hose-type clamp passed there through and secured around the drainage line. The downward projecting tang that partially conforms to the drainage line curvature can also be extended sideways (outward) beyond the support plate and the hose clamp passed around both the projecting tang and the drainage line and fastened around both.

In all of these configurations, it is to be understood that preferably two U-bolts are used and that they are located on both sides of the gate valve housing and that, if more than one downwardly projecting tang is used, they are located in such a fashion so that the gate valve housing can rest between the projecting tangs. It is also to be understood that the U-bolt can pass around the drainage line or around the circular boss that is part of the gate valve housing that receives the drainage line.

A hydraulic cylinder that consists of a cylindrical housing with a hydraulic rod projecting from one end is attached to the support plate by suitable means. Such means can consist of two upwardly projecting, support plate tangs with aligning holes. The tangs are positioned so as to receive a boss on one end of the cylinder housing that has an aperture in it so that the apertures in the tangs and the aperture in the boss align so as to receive a pivot pin. The pivot pin is locked into place by any suitable means including a forced fit into the apertures in the tangs or a head at one end of the pivot pin, too large to pass through the tang apertures and a cotter pin, nut or other suitable attaching means at the other end.

A pivot arm with a first and a second end and a pivoting means between the two ends is secured to the projecting end of the hydraulic rod. In a simple version, the projecting end of the hydraulic rod and the first end of the pivot arm have aligning holes through which a pivot pin is passed and locked into place by means of a cotter pin or other suitable means. In a preferred and more stable version, the pivot arm has two legs that project from the first end with each leg having an aligning hole through it. The end of the hydraulic rod also has a hole in it and the end of the hydraulic rod is received between the legs of the pivot arm so that the holes in the legs of the pivot arm and the hole in the end of the hydraulic rod align so as to receive a pivot pin that is suitably secured.

The other end of the pivot arm is suitably secured to a control rod of the gate valve. This control rod is joined at one end to the gate of the gate valve and at the other end to the second end of the pivot arm. The second end of the pivot arm is secured to an end of the control rod by means of a collar that passes around the control rod and has a projecting tang to receive the second end of the pivot arm. The pivot arm and the tang of the collar have suitable aligning apertures for receiving a pivot pin through them. The pivot pin is secured by means of a locking pin. By removing the locking pin and pivot pin, the control rod is capable of being disconnected from the hydraulic mechanism of this invention. The collar can be secured on the end of the control rod by means of other collars that are securely attached to the control rod by means of set screws or other locking devices and are positioned on either side of the tanged collar. Alternatively, the tanged collar can itself have a set screw for locking it to the control rod.

The invention further consists of a means for securing the pivoting means of the pivot arm to the support plate. This is accomplished by providing a connecting plate that is attached at one end to the pivot means of the pivot arm and at the other end to a tang projecting from the support plate. Both ends of the connecting plate are attached to the tang and to the pivot arm by means of a pivot pin and suitable fastening means for the pivot pin.

As discussed previously, the hydraulic cylinder is operated by means of hydraulic fluid, a method or means for pumping the hydraulic fluid into or out of the cylinder or both, such means being a motor, preferably a reversing motor, a control means for controlling the motor, hydraulic valves in the hydraulic line for controlling the amount of hydraulic fluid in the cylinder and as a result, the position of the gate in the gate valve, and means for controlling the hydraulic valve such as a solenoid.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

BRIEF DESCRIPTION OF THE DRAWINGS

FIG. 7 is a plan view of an alternate embodiment of the valve operating mechanism of the present invention.

Figure 1:
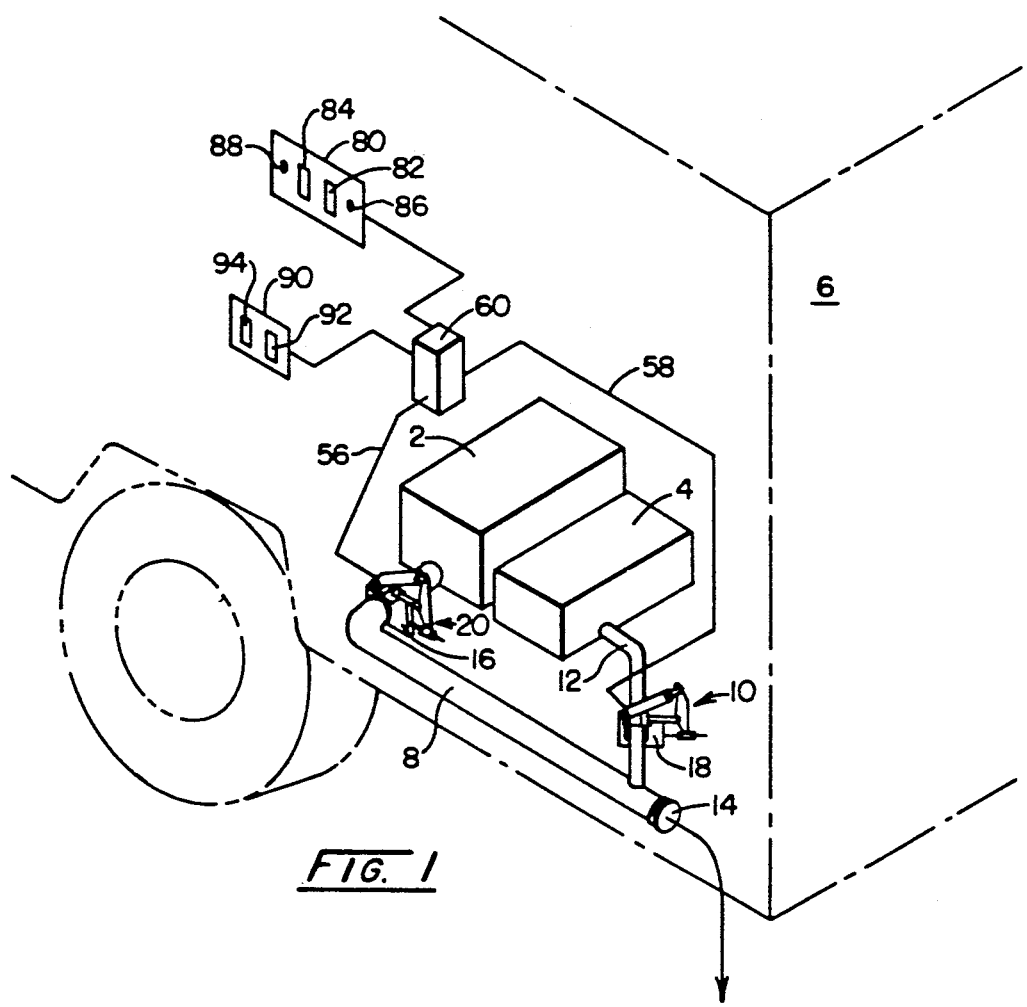
FIG. 1 is a partial perspective and schematic view of a vehicle embodying the present invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalence thereof.

DETAILED DESCRIPTION OF THE INVENTION AND BEST MODE FOR CARRYING OUT THE PREFERRED EMBODIMENT

FIG. 1 is a perspective view showing the general arrangement of the components of this invention in a recreational vehicle (RV) 6 shown in phantom. It is to be understood that the invention is not limited to RVs but, in fact, could be used in any mobile vehicle where it is necessary or desirable to have one or more holding tanks and to periodically discharge such holding tanks.

Waste water from toilets (water closets; not shown) is discharged into a waste water holding tank 2 while gray water from sinks, showers, and bath tubs (not shown) is discharged into a gray water holding tank 4. The discharge line 12 from the gray water tank is typically connected to the discharge line 8 from the waste water holding tank 2. Discharge line 8 has a cap 14 at its end to prevent inadvertent discharge into the environment. Manual gate valves 16 and 18 are incorporated into discharge or drain line 8 and discharge or drain line 12 to control the flow of waste water and gray water from the holding tanks 2 and 4, respectively.

In normal operation, the cap 14 is removed from the end of the discharge line 8 and connected to the sanitary sewer by means of a flexible pipe or other connecting means(not shown). The waste water holding tank is first discharged by opening gate valve 16. After the waste water holding tank 2 has been discharged, gate valve 16 is closed and the gray water holding tank 4 is discharged by opening gate valve 18. The gray water holding tank 4 is discharged after the waste water in order to rinse the flexible pipe or other connecting means. Gate valves 16 and 18 are then closed and the end cap 14 replaced on discharge line 8.

As can be seen in FIG. 1, gate valves 16 and 18 are typically located below and toward the center of the RV 6. As such, the operator must kneel or otherwise position him or herself under the vehicle to open manually gate valves 16 and 18. Such a position is particularly uncomfortable and insecure at night and strange surroundings especially when accompanied by biting insects and drenching rain. Such a position can be particularly unpleasant should the flexible pipe or other means for connecting drainage pipe 8 to the sanitary sewer come lose during the discharge of waste water from holding tank 2.

This invention eliminates the need for manual operation of gate valves 16 and 18 by providing hydraulic mechanisms 20 and 10. These mechanisms are essentially similar in nature except for the fact that they are of different sizes to accommodate the different sized gate valves found in the different sized waste water and gray water lines. The hydraulic mechanism is connected to a hydraulic pump, motor, and other control devices indicated schematically by the numeral 60 in FIG. 1. The hydraulic mechanisms 10 and 20 are connected to the hydraulic center 60 by means of hydraulic lines 58 and 56.

Typically, the switch means 80 is located within the recreational vehicle 6 while switch means 90 is located on the outside of the recreational vehicle 6 in such a position so as to allow the user to observe the drainage of the tanks into a sanitary sewer. Switch means 80 has a switch 82 for controlling hydraulic means 10 and switch 84 for controlling hydraulic mechanism 20. Switch means 90 has a switch 92 for controlling hydraulic mechanism 10 and switch 94 for controlling hydraulic mechanism 20. Switch means 80 also has an indicator light 86 to indicate the position of gate valve 18 and indicating means 88 for indicating the position of gate valve 16.

By placing hydraulic mechanisms 10 and 20 on gate valves 16 and 18, it is possible to discharge the waste water from tanks 2 and 4 either remotely from within the recreational vehicle 6 or from a position on the outside of the RV 6 so as to observe the discharge from the tanks. Such hydraulic mechanisms completely eliminate the need to crawl under the RV to open gate valves 16 and 18.

Figure 2:
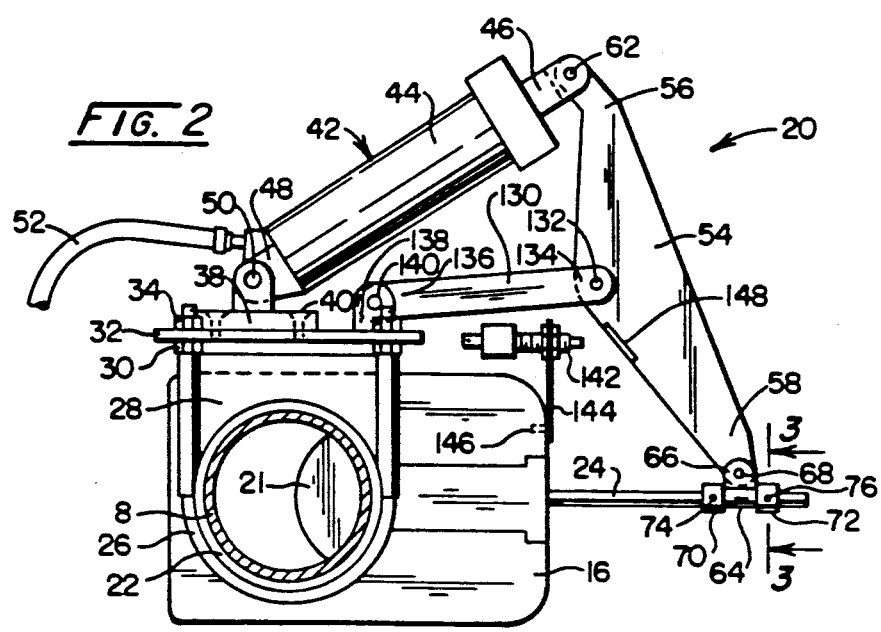
FIG. 2. is a plan view of an embodiment of the valve operating mechanism of the present invention.

FIG. 2 is a front elevational view showing the details of the operation of the hydraulic mechanism 20. The gate valve (gate valve housing) 16 has a circular boss 22 for receiving an end of the discharge line 8. The drainage line 8 is joined to the circular boss 22 of the gate valve 16 by suitable means such as a plastic cement. The gate valve 16 has a control rod 24 that is attached to the gate 21 of the gate valve and projects from the gate valve 16 so as to control the movement of the gate by being pushed into or pulled out of the gate valve 16.

In the embodiment shown in FIG. 2, a clamp 26 is passed around the circular boss 22. A saddle member 28 is then placed on the U-clamp and the U-clamp firmly bolted to the circular boss by means of nuts 30. Two U-clamps are used on each side of gate valve 16. A support plate 32 having appropriate aligning apertures therethrough to receive the ends of the U-clamp 26 is then placed on the ends of the U-clamp 26 and firmly secured to the U-clamp by means of nuts 34.

Figure 5:
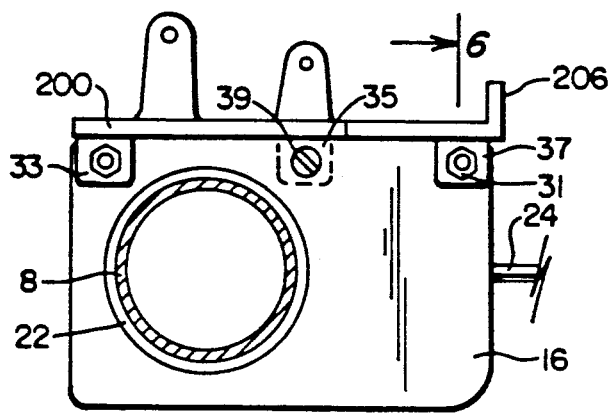
FIG. 5 is a plan view of an alternate method for attaching the support plate to the valve.

In an alternate and preferred embodiment shown in FIG. 7, the saddle member 28 is replaced by a downwardly projecting tang 36 that generally conforms to the outer surface of the drainage line 8 or the circular boss 22. In FIG. 5, the U-clamp 26 passes directly through the apertures in support plate 32 and is bolted thereto. The U-clamp 26 can pass around the circular boss 22 or around the drainage pipe 84. For the purposes of this description the circular boss 22 is considered to be a part of the gate valve 16.

In another embodiment of the device (not shown), the support plate tang 36 can have a slot through it capable of receiving a hose clamp. The hose clamp is passed through the slot and around the circular boss 22 or the drainage pipe 8 so as to secure the support plate 36 to the drainage line 8 or the circular boss 22 thereby eliminating the U-bolts 26. It is also possible to extend the support tang 36 outward (sideways) beyond plate 32 and pass a clamp or other securing means around the projecting tang 36 and the drainage line 8. For the purposes of this invention, these and alternate fastening means are considered to be equivalent.

Figure 6:
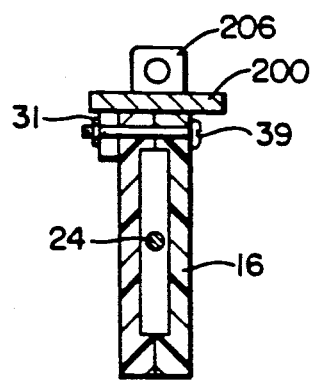
FIG. 6. is a cross sectional view of the support plate securing means along line 6—6 of FIG. 5.

In yet another embodiment shown in FIGS. 5 and 6, it is possible to secure the support plate with one or more downwardly projecting tangs 33, 35, and 37 that are secured directly to the gate valve 16 rather than to the circular boss 22 or drainage line 8. The downward projecting tangs 33, 35 and 37 are fastened to the gate valve 16 by means of suitable fasteners such as nuts 31 and bolts 39 passing through the gate valve 16.

In FIG. 2, the support plate 32 has a hydraulic cylinder tang 38 attached to it by means of suitable fasteners such as machine screws 40. The hydraulic cylinder 42 is comprised of a cylindrical housing 44, a hydraulic rod 46 that projects out of the center of one end of the cylindrical housing 44 and a hydraulic cylinder boss (tang) 48 that is secured to or a part of the hydraulic cylinder housing 44 at the end opposite the hydraulic rod 46. The hydraulic cylinder housing boss 48 has an aperture through it and is attached to the hydraulic cylinder tang 38 by pivoting means such as a pivot pin 50. The pivot pin passes through the apertures of the hydraulic cylinder tang and the hydraulic cylinder housing tang and is suitably secured by suitable means such as, for example, by an enlarged head at one end of the pivot pin 50 and a securing pin at the other end of the pivot pin 50. The hydraulic cylinder 42 also has a hydraulic line 52 that allows for the admission and release of hydraulic fluid into and out of the hydraulic cylinder 42.

Figure 3:
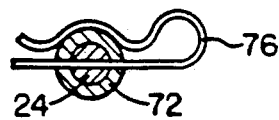
FIG. 3. is a cross-sectional view of the invention disconnect means along line 3—3 of FIG. 2.

A pivot arm 54 has a first end 56 and a second end 58. The first end 56 is secured to the hydraulic rod 46 by means of suitable aligning apertures in the hydraulic rod 46 and the end 56 of the pivot arm 54 and a pivoting means such as a pivot pin 62. The second end 58 of the pivot arm 50 is secured to the control rod 24 of the gate valve 16 by means of a collar 64 that has a tang 66 having an aperture in it that aligns with an aperture in the second end 58 of the pivot arm 54. A pivot pin 68 is passed through the apertures in the second end 58 of the pivot arm 54 and the collar tang 66 and secured b.: suitable means such as an enlarged head at one end of the pivot pin 68 and a securing pin such as a cotter or locking pin at the other end. The collar 64 may be secured to the control rod 24 by means of circular collars 70 and 72. Collar 70 is secured to the control rod 24 by means of a set screw 74. As seen in FIG. 3, collar 72 is secured to the control rod 24 by means of aligning apertures that pass through both the collar 72 and the control rod. A securing pin 76 passes through the apertures and secures the collar in place. Using this means of attachment, the pin 76 can be readily removed thereby releasing the collar 72 from the control rod 24 and allowing the collar 64 to the removed from the control rod 24 in those instances where power is lost or the user is otherwise unable to control the hydraulic mechanism in its usual fashion. In such an instance, a handle 202 (FIG. 7) can be secured to control rod 24 and the gate valve 16 manually operated. Alternatively, collars 70 and 72 may both be secured to control rod 24 by means of set screws with the second end 58 of the pivot arm 54 being released from collar tang 66 by removing the securing pin (a pin such as pin 76 shown in FIG. 3) from the pivot pin 68 and removing pivot pin 68.

Returning to FIG. 2, the pivot arm 54 is secured to the support plate 32 by means of a connecting plate 130. The connecting plate 130 is secured to the pivot arm 54 by means of aligning apertures in the pivot arm and a first end 134 of the connecting plate 130. The apertures are secured with a pivot pin 132 and means for securing the pivot pin within the apertures. The second end 136 of connecting plate 130 is secured to the support plate tang 138 by means of aligning apertures that receive a pivot pin 140 which is suitably secured.

A switch 142 is secured to the gate valve 16 by means of an attaching arm 144 that is secured to the gate valve 16 by means of a machine screw 146. As the pivot arm 54 moves the gate valve rod 24 into the closed position, the pivot arm contact flange 148 makes contact with switch 142 causing an indicator light 88 to be turned either on or off. Preferably, the light is off when the gate 21 is in the closed position and comes on as the pivot arm contact flange 148 disengages switch 142 as the gate 21 is opened.

Figure 4:
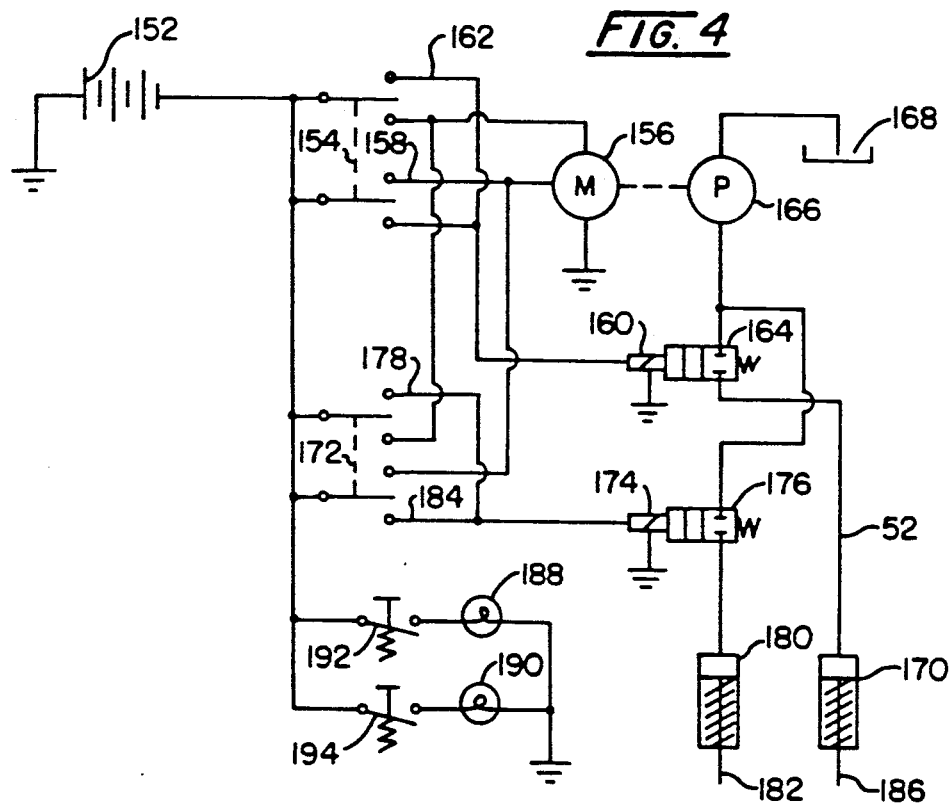
FIG. 4 is a schematic diagram of the electrical and hydraulic system of this invention.

FIG. 4 illustrates the hydraulic and electrical control system by which the hydraulics are operated. Typically, the electrical system operates off of the recreational vehicle 6 battery 152. Hydraulic cylinder 170 is operated by switch 154 while hydraulic cylinder 180 is operated by switch 172. Switches 154 and 172 are three position switches such as a rocker-type switch that is disconnected in its center or second position.

In the first position of switch 154, motor 156 is activated by closing the circuit to electrical connector 158. Solenoid 160 is also activated through electrical connector 162. Solenoid 160 causes valve 164 to open. With valve 164 open, the motor 156 drives pump 166 which causes hydraulic fluid to flow from reservoir 168 to the hydraulic cylinder 170 forcing the cylinder rod 186 out of the hydraulic cylinder 170. When switch 154 is set to its third position, solenoid 160 is activated again opening valve 164. Motor 156 is also activated but this time in a reversing mode which causes hydraulic fluid to be returned from hydraulic cylinder 170 through the pump 166 and into reservoir 168 thereby causing the hydraulic rod 186 to be withdrawn into the hydraulic cylinder 170.

Switch 172 is shown in its second or disconnect position with solenoid 174 in the closed position. When such switch 172 is moved to its first position, solenoid 174 causes valve 176 to open as a result of a connection through connector 178. In the first position, motor 156 is caused to operate in a forward position, causing pump 166 to pump hydraulic fluid from reservoir 168 through valve 176 into hydraulic cylinder 180 causing hydraulic cylinder rod 182 to move out of the hydraulic cylinder 180. When switch 172 is allowed to return to its open position, solenoid 174 closes valve 176 thereby maintaining fluid in hydraulic cylinder 180 and the rod 182 in a fixed position. When the switch 172 is moved to its third position, the solenoid 174 opens valve 176 and the motor 156 operates in a reverse manner causing pump 166 to withdraw hydraulic fluid from hydraulic cylinder 180 and return it reservoir 166 thereby causing hydraulic cylinder rod 182 to be withdrawn into the hydraulic cylinder 180 thereby opening gate valve 16.

The position of the gate 21 in the gate valve 16 can be shown by means of indicator lights 188 and 190, each being used with a separate hydraulic cylinder. The indicator lights 188 and 190 are used in conjunction with contact switches 192 and 194, respectively. As illustrated, the contact switch would normally cause the lights 188 and 190 to be in the "on" position when the gate valve is open such as is shown in FIG. 2. When the pivot-arm contact plate 148 disengages from switch 142 as when the gate is in the opened position, switch 142 is closed causing current to flow and the indicator light to be activated.

In FIG. 4, cylinder rods 182 and 186 relate to cylinder rod 46 in FIGS. 2 and 7, switches 154 and 172 relate to switches 82 and 84 or 92 and 94 in FIG. 1, lights 188 and 190 relate to lights 86 and 88 in FIG. 1, and switches 192 or 194 relate to switch 142 in FIGS. 2 and 7.

FIG. 7 illustrates some additional refinements that may be incorporated into this invention. Tang 204 rests on the edge of gate valve 16 to provide additional stability and ease of assembly when mounting the hydraulic mechanism 20 on the drainage line 8 or circular boss 22. Switch tang 206 (see also FIGS. 5 and 6) provides a convenient mounting location for switch 142. For additional mechanism stability, a clevis can be formed at the first end 56 of the pivot arm 54 so that the legs 208 of the clevis receive the end of the hydraulic rod 46 between them. Tang 210 can be cast as an integral part of support plate 32. In addition, a pair of tangs 210 can be provided so as to receive the hydraulic cylinder tang 48 between them. Tang 212 may also be cast as an integral part of support plate 32. A pair of tangs 212 may be used with a pair of connecting plates 130 that are placed on each side of pivot arm 54. When a pair of connecting plates 130 are used, bosses 214 cast as a part of pivot arm 54 (or separate sleeves) are used so that a sufficient distance is provided between plates 130 so that they do not contact switch tang 206 or switch 142.

It is possible that changes in configurations to other than those shown could be used but that which is shown if preferred and typical. Without departing from the spirit of this invention, various means of fastening the components together may be used.

It is therefore understood that although the present invention has been specifically disclosed with the preferred embodiment and examples, modifications to the design concerning sizing and shape may be apparent to those skilled in the art and such modifications and variations are considered to be within the scope of the invention and the appended claims.

What is claimed is:

1. An external hydraulic device for operating a gate valve in a drainage line of a holding tank of a recreational vehicle comprising:
   a. a support plate;
   b. means for fastening said support plate to said drainage line
   c. a hydraulic cylinder comprising a housing and a hydraulic rod;
   d. means for attaching said hydraulic cylinder housing to said support plate;
   e. a pivot arm having a first and second end and a pivoting means therebetween;

f. means for securing said pivot arm at said first end to said hydraulic rod;

g. means for securing said pivot arm at said second end to a control rod of said gate valve;

h. means for securing said pivoting means of said pivot arm to said support plate; and i. means for operating said hydraulic cylinder.

2. The hydraulic device for operating a gate valve according to claim 1 wherein said means for fastening said support plate to said drainage line is a U-bolt passing around said drainage pipe and passing through aligning holes in said support plate with means for attaching said U-bolt to said support plate.

3. The hydraulic device for operating a gate valve according to claim 2 wherein said means for attaching said U-bolt to said support plate is a nut.

4. The hydraulic device for operating a gate valve according to claim 1 with said support plate further compromising a downwardly projecting support tang having a surface conforming to a portion of said drainage line.

5. The hydraulic device for operating a gate valve according to claim 1 wherein said means for attaching said hydraulic cylinder to said support plate is a pivoting means.

6. The hydraulic device for operating a gate valve according to claim 5 with said pivoting means comprising a tang extending upward from said support plate with an aperture therein arranged so as to align with an aperture in a boss at an end of said hydraulic cylinder so as to receive a pivot pin therethrough.

7. The hydraulic device for operating a gate valve according to claim 1 with said means for securing said pivot arm to said hydraulic rod comprising an aperture in said first end of said pivot arm aligning with an aperture in an end of said hydraulic rod so as to receive a pivot pin therethrough.

8. The hydraulic device for operating a gate valve according to claim 1 with said means for securing said pivot arm to said support plate comprising:

a. a pivot arm tang projecting from said support plate and having an aperture therein;

b. a pivot plate having a first and a second end with said first end having an aperture therein aligning with said pivot arm tang aperture so as to receive a pivot pin therethrough and said second end of said pivot plate pivotally joined to said pivoting means of said pivot arm.

9. The hydraulic device for operating a gate valve according to claim 8 with said pivoting means of said pivoting arm comprising an aperture formed in said pivoting arm and aligning with an aperture in said second end of each said pivot plate so as to be pivotally joined thereto by means of a pivot pin.

10. The hydraulic device for operating a gate valve according to claim 1 with said means for operating said hydraulic cylinder comprising a hydraulic pump connected to said hydraulic cylinder by a hydraulic line and means for operating said hydraulic pump.

11. The hydraulic device for operating a gate valve according to claim 10 wherein said means for operating said hydraulic pump is an electric motor and switch means for operating said motor.

12. The hydraulic device for operating a gate valve according to claim 11 with said switch means comprising a switch located at a remote site.

13. The hydraulic device for operating a gate valve according to claim 11 wherein said electric motor is a reversing motor.

14. The hydraulic device for operating a gate valve according to claim 13 further comprising a control valve for controlling the amount of hydraulic fluid in said hydraulic cylinder so as to hold the gate valve in any position.

15. The hydraulic device for operating a gate valve according to claim 14 further comprising a solenoid for opening and closing said hydraulic fluid control valve and switch means for operating said solenoid.

16. The hydraulic device for operating a gate valve according to claim 1 further comprising indicating means for indicating a position of said gate valve.

17. The hydraulic device for operating a gate valve according to claim further comprising a disconnect means whereby said hydraulic cylinder is disconnected from said gate valve for manual operation of said gate valve.

18. A hydraulic device for opening, closing or holding a holding-tank gate valve in any position wherein said gate valve is located in a passage connected to a holding tank of a recreational vehicle and comprising:

a. a hydraulic cylinder comprising a housing and a hydraulic rod projecting therefrom;

b. means for connecting said hydraulic rod to a gate of said gate valve; and c. hydraulic means for controlling the position of said hydraulic rod into or out of said hydraulic cylinder comprising a hydraulic pump for pumping a fluid into or out of said hydraulic cylinder housing so as to cause said hydraulic rod to move into or out of said cylinder housing.

19. The hydraulic device for opening, closing or holding a holding-tank gate valve in any position according to claim 19 with said means for controlling the position of said hydraulic rod into or out of said hydraulic cylinder further comprising:

a. a motor for operating said hydraulic pump and b. switch means for operating said motor.

20. The hydraulic device for opening, closing or holding a holding-tank gate valve in any position according to claim 19 with said means for controlling the position of said hydraulic rod into or out of said hydraulic cylinder further comprising a valve for maintaining varying amounts of hydraulic fluid in said hydraulic cylinder.

21. The hydraulic device for opening, closing or holding a hold-tank gate valve in any position according to claim 20 with said means for controlling the position of said hydraulic rod into or out of said hydraulic cylinder further comprising a solenoid for operating said hydraulic fluid maintaining valve.

22. The hydraulic device for opening, closing or holding a holding-tank gate valve in any position according to claim 19 wherein said motor is a reversing motor.

23. The hydraulic device for opening, closing or holding a holding-tank gate valve in any position according to claim 19 with such switch means comprising means for operating said motor in either a forward or reverse direction.

24. The hydraulic device for opening, closing or holding a holding-tank valve in any position according to claim 19 with said switch means comprising means for operating said motor from a remote location.

25. The hydraulic device for opening, closing or holding a holding-tank gate valve in and position according to claim 18 further comprising a disconnect means whereby said hydraulic cylinder can be disconnected from said gate valve for manual operation of said gate valve.

26. The hydraulic device for opening, closing or holding a holding-tank gate valve in any position according to claim 18 further comprising an indicating means for showing the position of said gate valve.

27. The hydraulic device for opening, closing or holding a holding-tank gate valve in any position according to claim 26 wherein said indicating means is a light.

28. An external hydraulic device for operating a gate valve in the drainage line of a holding tank of a recreational vehicle comprising:

a. a support plate;
b. means for fastening a support plate on the outside of a housing of said gate valve;
c. a hydraulic cylinder comprising a housing and a hydraulic rod;
d. means for attaching said hydraulic cylinder housing to said support plate;
e. a pivot arm having a first and a second end and a pivoting means therebetween;
f. means for securing said pivot arm at said first end to said hydraulic rod;
g. means for securing said pivot arm at said second end to a control rod of said gate valve;
h. means for securing said pivoting means of said pivot arm to said support plate; and
i. means for operating said hydraulic cylinder.

* * * * *